United States Patent [19]
Bowling et al.

[11] Patent Number: 6,058,586
[45] Date of Patent: May 9, 2000

[54] METHOD AND APPARATUS FOR REPAIRING PALLETS

[75] Inventors: Daniel L. Bowling, Norton; Timothy R. Beane, Grafton, both of Ohio

[73] Assignee: Pallet Recycling, Inc., Barberton, Ohio

[21] Appl. No.: 09/080,676

[22] Filed: May 18, 1998

[51] Int. Cl.$^7$ .................................................. B23P 6/00
[52] U.S. Cl. .................................. 29/402.11; 29/402.12; 29/426.3; 29/239
[58] Field of Search ...................... 29/239, 252, 426.1, 29/426.2, 426.3, 426.4, 426.5, 402.01, 402.02, 402.03, 823, 244, 253, 402.11; 414/796

[56] References Cited

U.S. PATENT DOCUMENTS

| | | |
|---|---|---|
| 3,740,815 | 6/1973 | Campbell et al. ............... 29/239 X |
| 3,837,557 | 9/1974 | Jureit et al. . |
| 3,991,459 | 11/1976 | Rapp . |
| 4,241,495 | 12/1980 | Wakeem . |
| 4,320,570 | 3/1982 | Williams . |
| 4,462,746 | 7/1984 | Smets . |
| 4,620,827 | 11/1986 | Sameshima et al. ............. 29/239 X |
| 4,750,255 | 6/1988 | Hufnagel . |
| 4,945,626 | 8/1990 | Dykstra et al. . |
| 5,101,546 | 4/1992 | Otani et al. ................. 29/426.3 O |
| 5,105,526 | 4/1992 | Dykstra et al. . |
| 5,205,197 | 4/1993 | Wiltshire . |
| 5,211,094 | 5/1993 | Johnson . |
| 5,243,751 | 9/1993 | Dykstra et al. . |
| 5,307,554 | 5/1994 | Johnson et al. . |
| 5,323,525 | 6/1994 | Johnson . |
| 5,333,555 | 8/1994 | McPhee . |
| 5,414,924 | 5/1995 | Johnson et al. . |
| 5,600,882 | 2/1997 | Beane . |

*Primary Examiner*—S. Thomas Hughes
*Assistant Examiner*—Steve Blount
*Attorney, Agent, or Firm*—Rankin, Hill, Porter, & Clark LLP

[57] ABSTRACT

A method for repairing pallets includes the steps of sorting the pallets into groups depending on the type of repair that initially needs to be made to each of the pallets. After the initial repair, the remaining damaged portions of the pallets ace repaired in separate processing lines. In certain instances, pallets from different groups can be combined for subsequent processing. Apparatus for repairing pallets includes an inverter for turning pallets face-up or face-down without manual effort, and a deckboard spreader for separating deckboards to enable defective deckboard-supporting blocks to be removed and replaced.

14 Claims, 5 Drawing Sheets

METHOD AND APPARATUS FOR REPAIRING PALLETS

BACKGROUND OF THE INVENTION

1. Field of the Invention

The invention relates to repairing wooden pallets and, more particularly, to a method and apparatus for repairing such pallets in a particularly efficient manner.

2. Reference to Related Patents

Reference is hereby made to application Ser. No. 09/080,790, filed concurrently by Timothy R. Beane, entitled Machine for Removing Stringers from Pallets (hereinafter "the Stringer Removal Patent"); U.S. Pat. No. 5,943,766, application Ser. No. 09/080,830, filed concurrently by Timothy R. Beane, entitled Machine for Inserting Stringers into Pallets (hereinafter "the Stringer Insertion Patent"); and application Ser. No. 09/080,673, filed concurrently by Timothy R. Beane, entitled Machine for Removing Deckboards from Pallets (hereinafter "the Deckboard Removal Patent"), the disclosures of which are incorporated herein by reference.

3. Description of the Prior Art

Load-bearing pallets fabricated of wooden components frequently are used to transport and store various articles, machines, or materials. Such pallets generally are of two types: the stringer type and the block type. Stringer-type pallets include three spaced, parallel support members to which upper and lower deckboards are nailed. Block-type pallets employ a number of relatively small, spaced blocks to which upper and lower deckboards are nailed. The spaces between the stringers or the blocks are adapted to receive the tines of conventional forklift trucks.

In the course of being moved from place to place, the pallets frequently become damaged. If a damaged pallet is not repaired, it must be discarded because of its inability to safely and securely support and transport articles or materials. Because a new pallet is expensive, it is desirable to repair damaged pallets rather than to buy new ones, if possible.

End users of the pallets usually have no capability to repair pallets. As a consequence, pallet repair facilities have been established. Pallet repair facilities collect pallets from end users (or pay independent contractors to collect the pallets), repair the pallets, and sell the pallets to new users. In certain circumstances, the pallets will be owned by a company that leases the pallets to its users. In such cases, pallet repair facilities will repair the leased pallets for an agreed-upon fee.

Due to the large number of pallets that must be repaired, it is important that high quality pallet repairs be done quickly and inexpensively. Unfortunately, pallet repairs usually are done by hand. That is, damaged pallets must be partially or totally disassembled with crowbars or similar manual tools and reassembled with new components. Although machines are available that totally dismantle pallets, such machines usually cannot be used to remove and replace selected components of a pallet. See, for example, U.S. Pat. Nos. 4,241,459; 4,320,570; 4,750,255; 4,945,626; 5,105,526; 5,211,094; 5,205,197; 5,243,751; 5,307,554; 5,323,525; 5,414,924; and 5,600,882 for teachings of representative pallet dismantling machines.

During the course of processing, the pallets must be lifted and inverted by hand. When deckboards must be separated in order to remove and replace defective stringers or blocks, the separation is accomplished by hand tools. The extensive manual labor required to repair pallets is a limiting factor in the speed (and, hence, the cost) with which a pallet can be repaired.

Because pallet repair involves a great deal of manual labor, there is a risk of injury to workers. The pallets are heavy, about 70 or 80 pounds, and thus only physically strong workers are suitable for pallet repair work. The extreme physical requirements for pallet repair work limit the labor pool of suitable workers. Even when suitable workers are available, the demands of the job result in a high worker turnover rate.

Another problem with pallet repair is that all pallets are processed along a single repair line. If a pallet needs a number of components to be replaced, a relatively long time will be needed to repair the pallet. In such cases, several workers may have to work on a single pallet at the same time. On the other hand, if a pallet need only a few number of components to be replaced, a relatively short time will be needed to repair the pallet. By mixing badly damaged pallets with less damaged pallets, the overall time required to process all pallets is increased.

Desirably, a method and apparatus would be available that would enable pallet repairs to be accomplished with a minimum of manual labor and with an increase in processing speed. Such method and apparatus hopefully would minimize the risk of injury to workers while greatly reducing the physical demands that are imposed on the workers.

SUMMARY OF THE INVENTION

The present invention provides a new and improved method for repairing pallets that sorts the pallets into groups depending on the type of repair that initially needs to be made to each of the pallets. After the initial repair, the remaining damaged portions of the pallets are repaired in separate processing lines. In certain instances, pallets from different groups can be combined for subsequent processing after initial repairs have been made. Apparatus according to the invention for repairing pallets includes an inverter for turning pallets face-up or face-down without manual effort, and a deckboard spreader for separating deckboards to enable defective deckboard-supporting blocks to be removed and replaced.

With respect to stringer pallets, the invention involves the steps of orienting the pallets so that the lower deckboards face upwardly and then sorting the pallets into four groups, the first group having two or more damaged stringers, the second group having one damaged stringer, the third group having no damaged stringers and no damaged lower deckboards, and the fourth group having no damaged stringers and one or more damaged lower deckboards. The pallets then are processed in separate repair lines. Block pallets are processed in a similar manner.

In certain circumstances, it is desirable to combine groups of pallets after the initial repair has been made. For example, after stringer pallets in the first group have been repaired, they can be combined with pallets in the third group if they have no damaged lower deckboards. Similar combinations can be with made with pallets in the other groups. Such combinations greatly increase the speed with which pallet repairs can be accomplished.

The pallet inverter according to the invention includes a cage mounted on a rotatable axle, the cage having four chambers into which a pallet can be inserted, each chamber being spaced ninety degrees from adjacent chambers in the direction of rotation of the cage. A first conveyor having powered rollers on which pallets are disposed for movement therealong is disposed upstream of the cage and is adapted to feed pallets into the cage. A second conveyor having powered rollers on which pallets are disposed for movement therealong is disposed downstream of the cage and is adapted to withdraw pallets from the cage. A movable stop bar is disposed immediately upstream of the cage, the stop bar being movable from a first position where movement of pallets into the cage is prevented, and a second position where movement of pallets into the cage is permitted. The cage is oriented so that two opposed chambers are horizontal and two opposed chambers are vertical.

The inverter includes sensors for sensing the presence or absence of a pallet in the upstream horizontal chamber and for sensing the presence or absence of a pallet in the downstream horizontal chamber. The stop bar is lowered to advance a pallet into the upstream horizontal chamber when that chamber is empty. Immediately thereafter, the stop bar is raised to prevent the next upstream pallet from interfering with movement of the cage. Thereafter, the cage is rotated ninety degrees in the direction of conveyor movement when the presence of a pallet is sensed in the horizontal upstream chamber and the absence of a pallet is sensed in the horizontal downstream chamber. After a pallet has been withdrawn from the horizontal downstream chamber, the stop bar is lowered to advance another pallet into the upstream horizontal chamber when that chamber is empty.

The invention further includes a sensor for sensing the rotational position of the cage. In the preferred embodiment, the sensor is in the form of a pair of openings extending through the shaft at right angles to each other. A light source is disposed relative to the shaft such that a beam of light can be directed through a selected opening in the shaft. A light detector is disposed relative to the shaft such that light from the light source can be received by the light detector when the light source and the selected opening are aligned. The light detector sends a signal to the cage-rotating motor so as to control rotation of the cage.

The deckboard spreader according to the invention includes a table-mounted, powered cam which, when viewed from the end, is elliptical, the minor axis of the ellipse being smaller than the distance between the upper and lower deckboards and the larger axis of the ellipse being larger than the height of the blocks. The cam is disposed such that the major axis of the ellipse is horizontal. The cam is spaced a distance above the upper surface of the table such that upper and lower deckboards can be fitted over the cam. A pallet is placed on the table and moved such that upper and lower deckboards in the vicinity of a damaged block are disposed about the cam. By pivoting the cam through approximately ninety degrees, the deckboards will be separated.

In the preferred embodiment, the cam is secured to the end of a rotatable shaft, an arm is secured to the shaft, and the arm is connected to a power cylinder. Upon actuation of the power cylinder, the arm is moved which causes the shaft to be rotated. Preferably, the power cylinder is a pneumatic cylinder.

The foregoing and other features and advantages of the invention will be apparent from reviewing the following description and claims, taken in conjunction with the accompanying drawings.

DESCRIPTION OF THE PREFERRED EMBODIMENT

Figure 1:
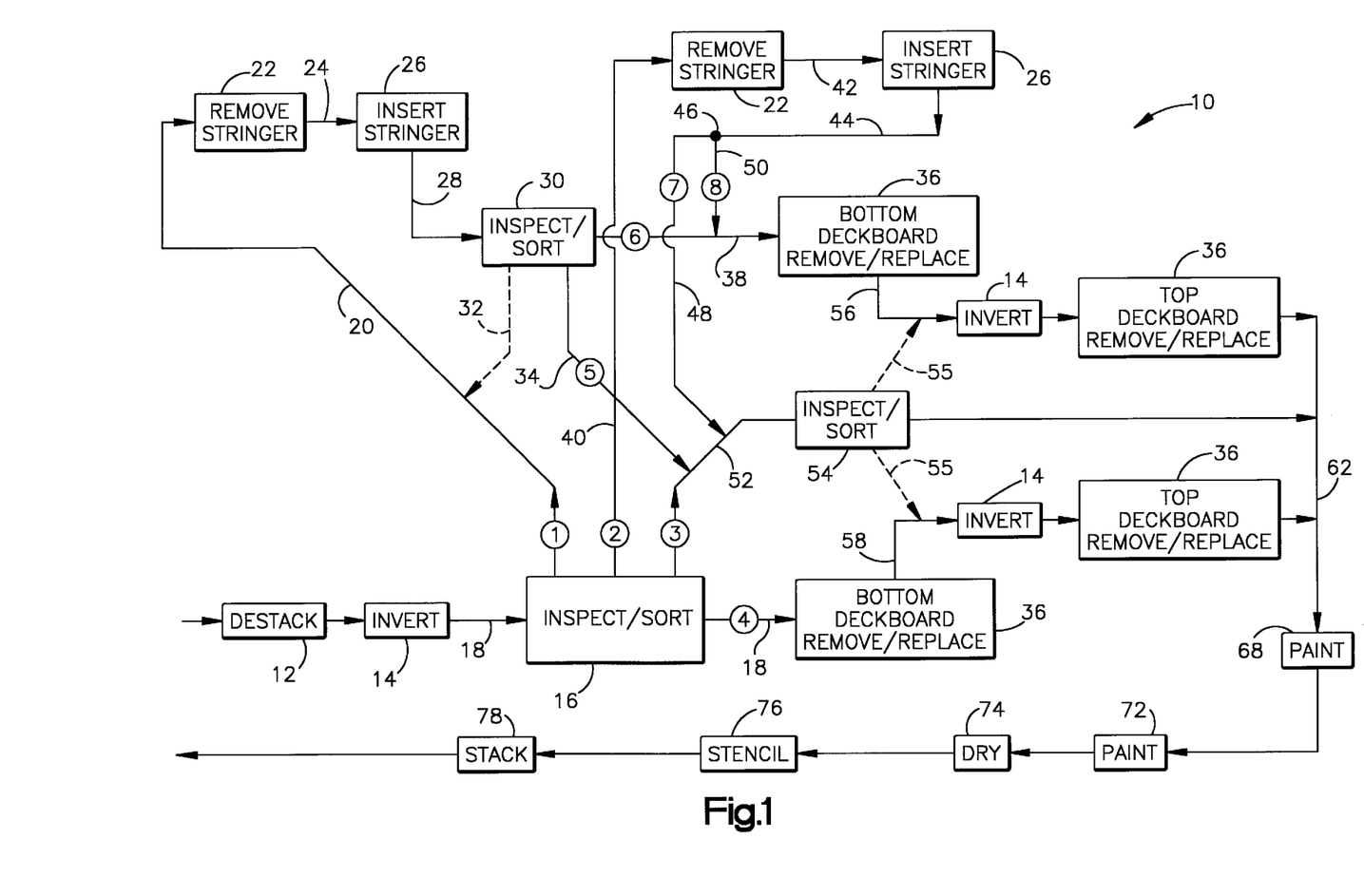
FIG. 1 is a flow chart showing schematically the method and apparatus according to the invention used to repair stringer pallets.

Referring particularly to FIG. 1, pallet repair apparatus especially adapted to repair stringer pallets is indicated generally by the reference numeral 10. The apparatus 10 includes a pallet destacker 12, a pallet inverter 14, and an inspection/sort table 16. The destacker 12, the inverter 14, and the table 16 are connected by conveyors 18 having powered rollers. The destacking operation can be performed manually, if desired.

At the inspection/sort table 16, the pallets are sorted into four groups:

1. pallets having two or more damaged stringers;
2. pallets having only one damaged stringer;
3. pallets having no damaged stringers and no damaged lower deckboards; and
4. pallets having no damaged stringers and one or more damaged lower deckboards.

Pallets in the first group are transferred by a conveyor 20 to a stringer removal machine 22. A preferred stringer removal machine is disclosed in the Stringer Removal Patent. After a stringer has been removed, the pallet is conveyed by a conveyor 24 to a stringer insertion machine 26. A preferred stringer insertion machine is disclosed in the Stringer Insertion Patent. After a stringer has been inserted into the pallet, the pallet is conveyed by a conveyor 28 to an inspection/sort table 30. The pallet is manually lifted onto the conveyor 20 as indicated at 32 for another pass through the stringer removal machine 22 and the stringer insertion machine 26.

After two, or possibly three, trips through the stringer removal machine 22 and the stringer insertion machine 26, the pallet will have all of the damaged stringers replaced with new stringers. At that point, the pallet is sorted into one of two additional groups:

5. pallets having no damaged lower deckboards; and
6. pallets having one or more damaged lower deckboards.

Pallets in the fifth group are added to pallets in the third group by way of a conveyor 34. Pallets in the sixth group are transferred to a deckboard removal machine 36 by way of a conveyor 38. A preferred deckboard removal machine is disclosed in the Deckboard Removal Patent. In each reference to a deckboard removal machine herein, unless otherwise noted, it is expected that the machine 36 not only will remove one or more defective deckboards, but also that the operator of the machine 36 will install new deckboards as needed. Such installation commonly is done by pneumatic nailing machines, although other techniques are possible.

Pallets in the second group are transferred by a conveyor 40 to another stringer removal machine 22. After the defective stringers have been removed from the pallets, the pallets are transferred by way of a conveyor 42 to another stringer insertion machine 26. After new stringers have been inserted and nailed in place, the pallets are transferred by a conveyor 44 to an inspection point 46 where they are divided into two groups:

7. pallets having no damaged lower deckboards; and
8. pallets having one or more damaged lower deckboards.

Pallets in the seventh group are added to pallets in the third group by way of a conveyor 48. Pallets in the eighth group are sent to the previously described deckboard removal machine 36 by way of a conveyor 50 that joins the conveyor 38. After all damaged lower deckboards have been removed and replaced, the pallets are transferred to a conveyor 56 for further processing, as will be described.

Pallets in the third group are sent by way of a conveyor 52 to an inspection/sort table 54. If inspection reveals that one or more upper deckboards are damaged, the pallets are transferred manually as indicated at 55 to one of two conveyors 56, 58 depending upon demand. In either case, pallets on the conveyors 56, 58 are sent to an inverter 14 and thereafter, by a continuation of the conveyors 56, 58, to deckboard removal machines 36. Any damaged upper deckboards will be removed by the deckboard removal machines 36 downstream of the conveyors 56, 58. A conveyor 60 also is provided to permit completely undamaged pallets to be sent downstream for further processing.

Pallets in the fourth group are sent along a continuation of the conveyor 18. The pallets in this group are sent to another deckboard removal machine 36 where all damaged lower deckboards are removed and replaced. Thereafter, the pallets are placed on the conveyor 58 for subsequent inversion and replacement of damaged upper deckboards, as described previously with respect to pallets in the third group.

Pallets from the deckboard removal machines 36 downstream of the conveyors 56, 58 and the conveyor 60 are directed onto a conveyor 62. Pallets on the conveyor 62 are passed through a paint machine 68. From the paint machine 68 they are conveyed to another paint machine 72. From the paint machine 72, the pallets are sent through an oven 74, a stenciling machine 76, and a stacking machine 78. The conveyor 62 runs through all of these machines. After the pallets have been stacked, they are conveyed elsewhere for storage and eventual shipment to customers.

Figure 2:
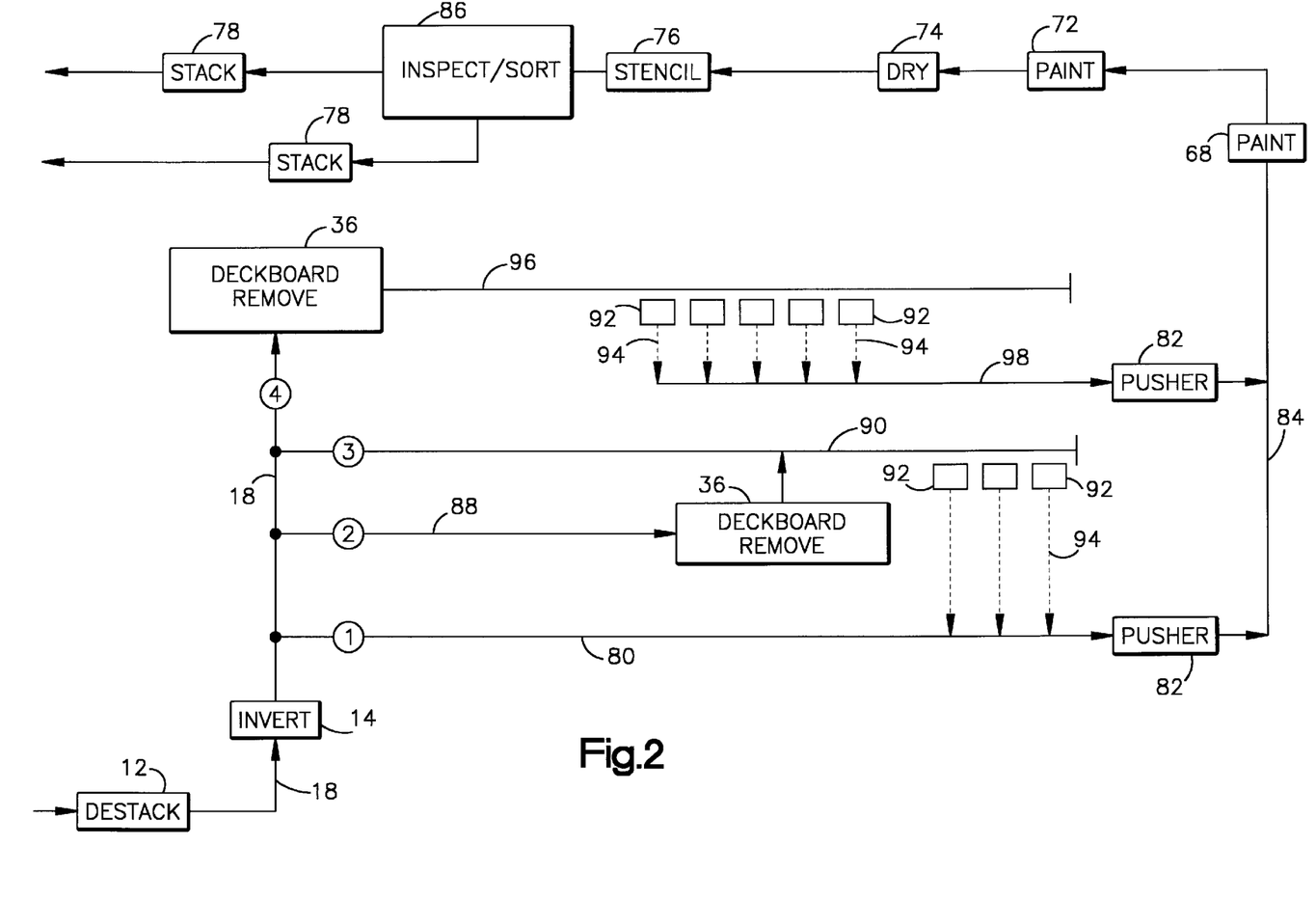
FIG. 2 is a flow chart showing schematically the method and apparatus according to the invention used to repair block pallets.

Referring now to FIG. 2, apparatus for repairing block pallets is illustrated schematically. Because certain components of the embodiment of FIG. 2 are the same, or substantially the same, as those described with respect to the embodiment of FIG. 1, like reference numerals will be used with respect to FIG. 2, where appropriate.

Block pallets to be repaired are sent to a destacking machine 12 (or are destacked manually) and thereafter are sent to an inverter 14 by way of a conveyor 18. After passing through the inverter 14, the lower deckboards face upwardly.

The pallets are sorted into four groups:
1. no damaged deckboards and no damaged blocks;
2. one or more damaged deckboards and no damaged blocks;
3. no damaged deckboards and one or more damaged blocks; and
4. one or more damaged deckboards and one or more damaged blocks.

Pallets in the first group are sent down a so-called "maintenance line" created by a conveyor 80. The pallets encounter a pusher 82 that pushes the pallets onto a discharge conveyor 84. As with the embodiment of FIG. 1, paint machines 68, 72, oven 74, and stenciling machine 76 are disposed in-line. The conveyor 84 runs through these machines. An inspection/sort table 86 is disposed downstream of the stenciling machine 74. Two stacking machines 78 are disposed downstream of the table 86. Pallets are inspected at the table 86 and are divided into two groups—"perfect" pallets and acceptable pallets.

Pallets in the second group are transferred from the conveyor 18 to a conveyor 88. A deckboard removal machine 36 is at the end of the conveyor 88. After any damaged deckboards have been removed, the pallets are transferred to a conveyor 90 having multiple repair tables 92. New deckboards are installed and damaged blocks are removed and replaced at the tables 92. After the repairs have been completed, the pallets are manually transferred as indicated at 94 to the conveyor 80.

Pallets in the third group are moved from the conveyor 18 to the conveyor 90 for further processing as described above for pallets in the second group.

Pallets in the fourth group are received by a deckboard removal machine 36 located at the end of the conveyor 18. After damaged deckboards have been removed, the pallets are placed on a conveyor 96 that conveys the pallets to additional repair tables 92. After the pallets have been repaired as described previously, they are placed manually as indicated at 94 onto another conveyor 98. Another pusher 82 pushes the pallets onto the conveyor 84 for finish processing.

Figures 3, 8:
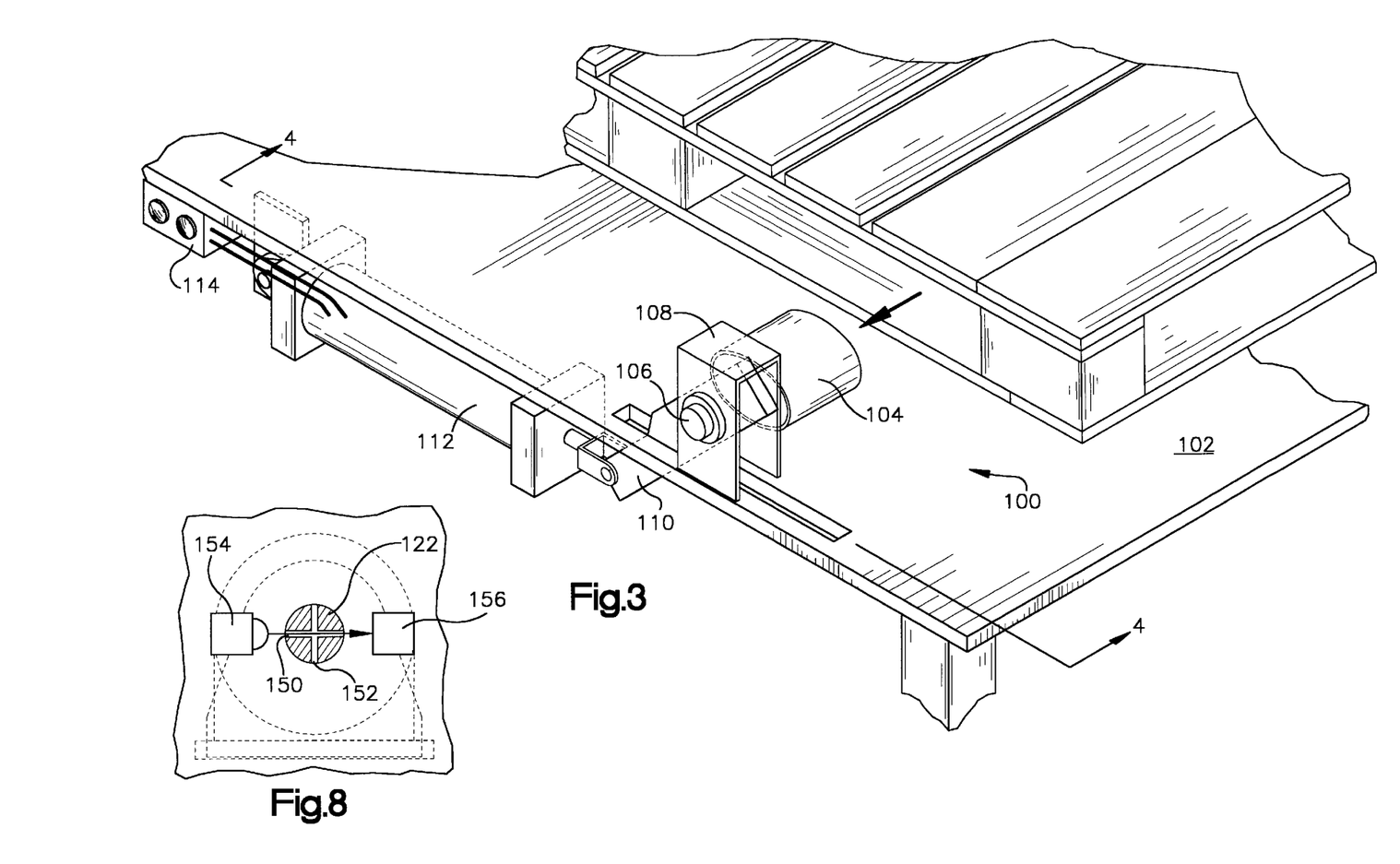
FIG. 3 is a perspective view of a deckboard spreader according to the invention.
FIG. 8 is an enlarged portion of FIG. 7 showing apparatus for controlling operation of the pallet inverter.
Figure 4:
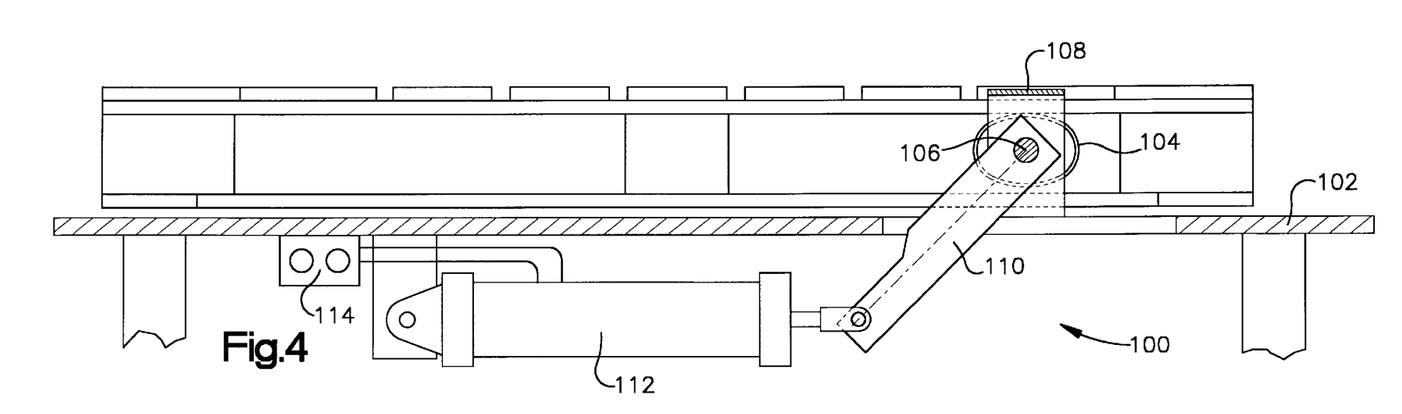
FIG. 4 is a side elevational view of the deckboard spreader of FIG. 3 showing a cam in a deckboard-receiving position.
Figure 5:
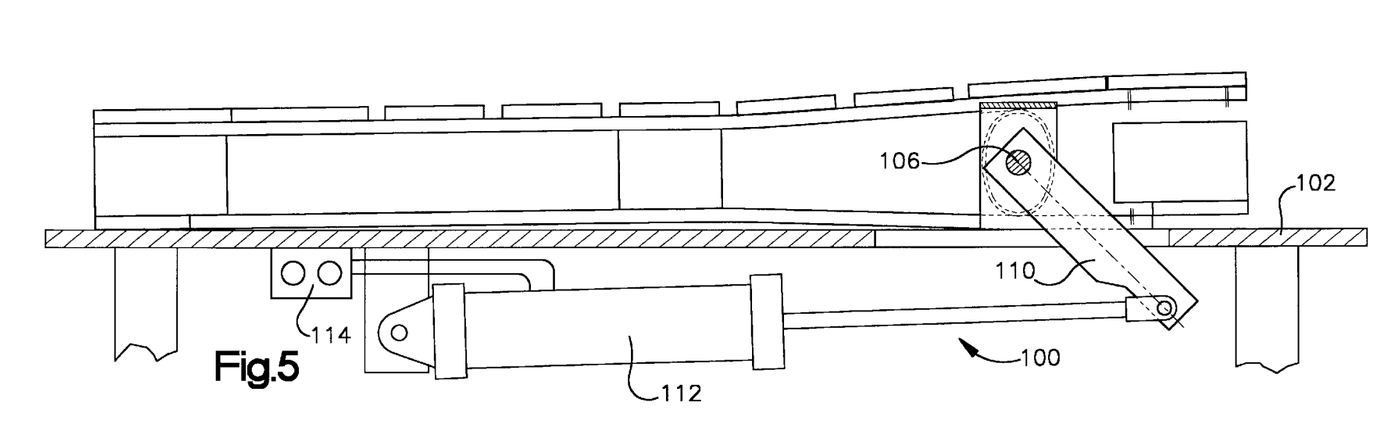
FIG. 5 is a view similar to FIG. 4 in which the cam has been moved to a deckboard-spreading position.

The invention includes a device for spreading the deckboards of the pallet in order to remove and replace any damaged blocks. The device is indicated in FIGS. 3–5 by the reference numeral 100. Pallets to be repaired in this manner are disposed atop a table 102. The device 100 includes a cam 104. The cam 104, when viewed from the end (FIGS. 4 and 5) is in the form of an ellipse having a major axis and a minor axis. The minor axis is slightly less than the spacing between upper and lower deckboards. The major axis is greater than that distance.

The cam 104 is disposed at the end of a shaft 106 that is supported for rotation by a bracket 108. A link 110 is rigidly connected to the shaft 106, and a pneumatic cylinder 112, mounted beneath the table 102, is connected to the link 110. A switch 114 is provided to control operation of the cylinder 112. When the cylinder 112 is in the retracted position (FIG. 4), the cam 104 is disposed such that the major axis is horizontal, thereby permitting the deckboards to be fitted over the cam 104. In this connection, it will be noted that the shaft 106 is supported by the bracket 108 at a position high enough above the upper surface of the table 102 to facilitate the pallet being moved into position.

Upon actuation of the cylinder 112 (FIG. 5), the cam 104 is turned such that the major axis of the cam 104 is vertical. The deckboards are spread apart from the block connecting them, thereby permitting the nails joining the deckboards to the block to be sheared. Such shearing can occur by a variety of techniques, but use of a saber saw is preferred. After the defective block has been removed, it is replaced by a new block. Then, the cylinder 112 is retracted to the position shown in FIG. 4 and the block and the deckboards are connected to each other by nails.

Figure 6:
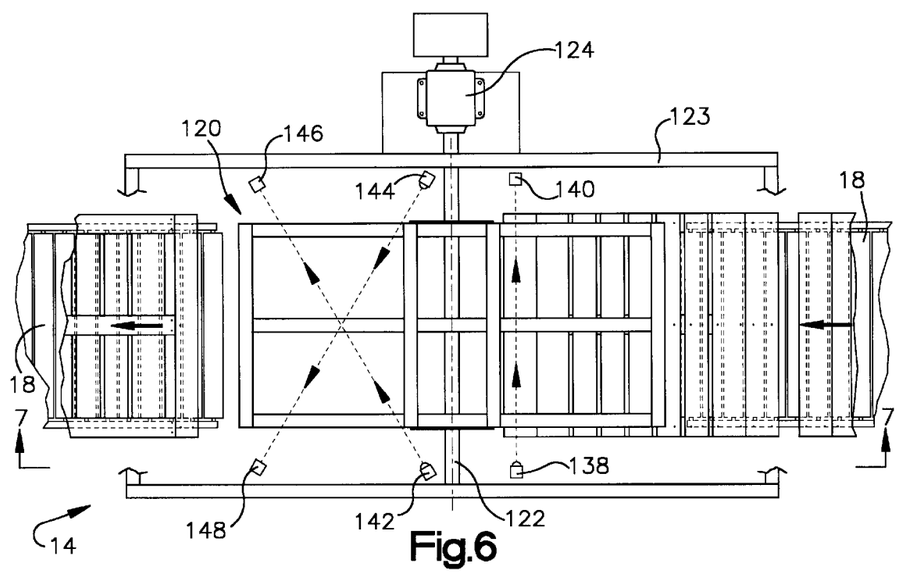
FIG. 6 is a top plan view of a pallet inverter according to the invention.
Figure 7:
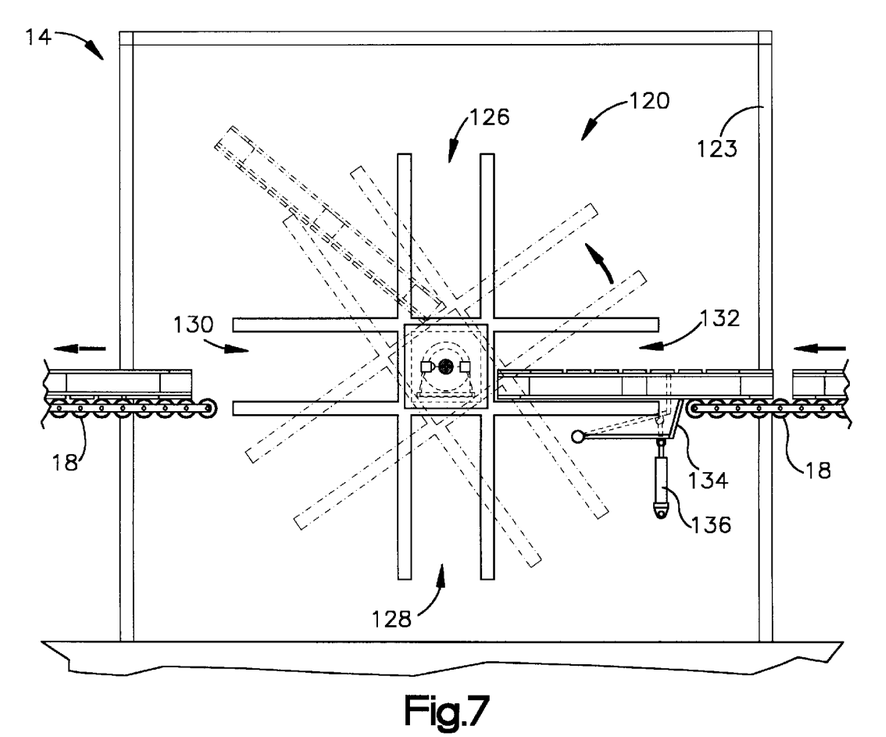
FIG. 7 is a side elevational view of the pallet inverter of FIG. 6.

Referring now to FIG. 6 and 7, the inverter 14 is shown. The conveyor 18, having powered rollers, also is illustrated in FIGS. 6 and 7. The conveyor 18 continuously attempts to push pallets into, or withdraw pallets from, the inverter 14. The inverter 14 includes a cage 120 mounted on a rotatable axle 122 that is supported by a frame 123. A drive motor 124 controls movement of the axle 122. The cage 120 has four chambers 126, 128, 130, 132. The chambers 126 and 128 are opposite each other, while the chambers 130, 132 are opposite each other. Each chamber 126, 128, 130, 132 is spaced 90 degrees from adjacent chambers in the direction of rotation of the cage 120.

A movable frame-mounted stop bar 134 is disposed immediately upstream of the cage 120. The stop bar 134 is actuated by a pneumatic cylinder 136 that moves the stop bar 134 between a retracted position where pallet movement is permitted (solid lines in FIG. 7) and an extended position where pallet movement is prevented (dashed lines in FIG. 7). A pallet stop clamp (not shown) is disposed upstream of the stop bar 134 in order to selectively relieve pressure on pallets being pushed into the cage 122. The stop clamp includes a stationary plate on one side of the pallets and a movable plate on the other side of the pallets. The stop clamp thus compresses the sides of the pallets to prevent their movement. The stop clamp is operated in conjunction with the bar 134. That is, the stop clamp is actuated to stop movement of the pallets prior to the stop bar 134 being raised, thereby preventing the pallets from interfering with operation of the stop bar 134.

The inverter 14 includes a photoelectric eye 138 and a corresponding photoelectric receiver 140 downstream of the stop bar 134 that senses the presence or absence of a pallet in the upstream horizontal chamber. The inverter 14 also includes two photoelectric eyes 142, 144 and corresponding photoelectric receivers 146, 148 downstream of the cage 120 to sense the presence or absence of a pallet in the downstream horizontal chamber. The beams emitted by the eyes 142, 144 are transmitted in a crossing pattern to prevent false signals from pallet misalignments, missing pallet components, or pallet reflections.

Referring to FIG. 8, the shaft 122 includes a pair of openings 150, 152 extending through the shaft 122 at right angles to each other. A photoelectric eye 154 is disposed relative to the shaft 122 such that a beam of light can be directed through a selected opening 150, 152 in the shaft 122. A photoelectric receiver 156 is disposed relative to the shaft 122 such that light from the eye 154 can be received by the receiver 156 when the eye 154 and the selected opening are aligned. The receiver 156 is connected by control equipment (not shown) to the motor 124 to control operation of the motor 124.

In use, the eye 154 and the receiver 156 are positioned such that the cage 120 when at rest is positioned as shown in FIG. 7. That is, in the rest position, the chambers 130, 132 are horizontal, and the chambers 126, 128 are vertical. When the receiver 140 senses the absence of a pallet in the chamber 132, the cylinder 136 is actuated so as to retract to the stop bar 134, thereby permitting a pallet to be pushed into the chamber 132. Then, the stop clamp is actuated and the stop bar 134 is raised to prevent upstream pallets from continuing to apply force to the pallet that has just been pushed into the chamber 132.

After the receivers 146, 148 sense that a pallet has been withdrawn from the chamber 130, the motor 124 is activated so that the shaft 122 turns in the direction of the arrow in FIG. 7. After the cage 120 has rotated 90 degrees (as detected by the receiver 156), rotation of the cage 120 will be stopped. Provided that the receiver 138 detects the absence of a pallet in the now-horizontal chamber 128, the cylinder 136 will be actuated to retract the stop bar 134, thereby permitting another pallet to be positioned in the chamber 128. The stop clamp and the stop bar 134 then will be actuated to prevent pallets from entering or attempting to enter the chamber 128.

As pallets continually are added to the succeeding chambers, the pallets in the downstream horizontal chamber will contact the downstream conveyor 18 and will be withdrawn by the powered conveyor rollers. The foregoing sequence of events is carried out continuously. It has been found that each quarter-turn of the shaft 122 takes about two seconds. Accordingly, it takes less than 10 seconds for a pallet to be inverted without any operator input or effort.

As will be appreciated from the foregoing description, the invention permits pallets of either the stringer type or the block type to be repaired exceedingly efficiently. By organizing the pallets into various groups depending upon the type of repairs that are needed, optimum production efficiency can be obtained. By use of the inverter 14, pallets can be processed rapidly, without any manual labor being required. This represents a significant advance over prior pallet repair techniques where substantial manual labor is required merely to invert the pallets. Further, as to block-type pallets, the deckboard spreader according to the present invention permits blocks to be removed and replaced easily, typically by a single operator. This is a significant advance over prior techniques where manual tools such as hand-operated cams and crowbars have been required to spread deckboards.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A method for repairing pallets, each pallet having spaced parallel stringers, upper and lower deckboards secured to the stringers, the deckboards being disposed perpendicular to the stringers, comprising the steps of:

orienting the pallets so that the lower deckboards face upwardly;

sorting the pallets into four groups, the first group having two or more damaged stringers, the second group having one damaged stringer, the third group having no damaged stringers and no damaged lower deckboards, and the fourth group having no damaged stringers and one or more damaged lower deckboards;

as to pallets in the first group:

removing a damaged stringer from a pallet;

replacing the damaged stringer with a new stringer;

repeating the steps of removing and replacing until all damaged stringers have been removed and replaced with new stringers;

sorting the stringer-repaired pallets into fifth and sixth groups, the fifth group having no damaged lower deckboards and the sixth group having one or more damaged lower deckboards;

adding pallets from the fifth group to the third group;

removing any damaged lower deckboards from pallets in the sixth group;

replacing any damaged lower deckboards from pallets in the sixth group with new lower deckboards;

inverting the pallets in the sixth group so that the upper deckboards face upwardly;

removing any damaged upper deckboards from pallets in the sixth group; and replacing any damaged upper deckboards from pallets in the sixth group with new upper deckboards;

as to pallets in the second group:
  removing the damaged stringer from each pallet;
  replacing the damaged stringer with a new stringer;
  sorting the stringer-repaired pallets into seventh and eighth groups, the seventh group having no damaged lower deckboards and the eighth group having one or more damaged lower deckboards;
  adding pallets from the seventh group to the third group; and
  adding pallets from the eighth group to the sixth group;

as to pallets in the third group:
  inverting the pallets so that the upper deckboards face upwardly;
  removing any damaged upper deckboards;
  replacing any damaged upper deckboards with new upper deckboards; and as to pallets in the fourth group:
  removing any damaged lower deckboards;
  replacing any damaged lower deckboards with new lower deckboards;
  inverting the pallets so that the upper deckboards face upwardly;
  removing any damaged upper deckboards; and
  replacing any damaged upper deckboards with new upper deckboards.

2. The method of claim 1, wherein the step of sorting the stringer-repaired pallets into fifth and sixth groups is performed manually.

3. The method of claim 1, wherein the step of sorting the stringer-repaired pallets into seventh and eighth groups is performed by directing the pallets onto a conveyor that selectively can divert pallets to the third group or the sixth group.

4. The method of claim 1, wherein the step of inverting pallets in the third group is performed manually.

5. The method of claim 4, wherein after the pallets have been inverted manually, further comprising the steps of:
  manually inverting the pallets that have damaged upper deckboards so that the lower deckboards face upwardly;
  providing a pallet-inverting machine;
  inverting the pallets again by use of the pallet-inverting machine so that the upper deckboards face upwardly; and
  performing the steps of removing and replacing damaged upper deckboards.

6. The method of claim 1, wherein the step of inverting the pallets so that the lower deckboards face upwardly is accomplished by:
  providing a cage mounted on a rotatable axle, the cage having four chambers into which a pallet can be inserted, each chamber being spaced ninety degrees from adjacent chambers in the direction of rotation of the cage;
  providing a first conveyor having powered rollers on which pallets are disposed for movement therealong, the first conveyor being disposed upstream of the cage and adapted to feed pallets into the cage;
  providing a second conveyor having powered rollers on which pallets are disposed for movement therealong, the second conveyor being disposed downstream of the cage and adapted to withdraw pallets from the cage;
  providing a movable stop bar immediately upstream of the cage, the stop bar being movable from a first position where movement of pallets into the cage is prevented, and a second position where movement of pallets into the cage is permitted;
  orienting the cage so that two opposed chambers are horizontal and two opposed chambers are vertical;
  sensing the presence or absence of a pallet in the upstream horizontal chamber;
  sensing the presence or absence of a pallet in the downstream horizontal chamber;
  lowering the stop bar to advance a pallet into the upstream horizontal chamber when that chamber is empty;
  raising the stop bar to prevent the immediate upstream pallet from impeding movement of the cage;
  rotating the cage ninety degrees in the direction of conveyor movement when the presence of a pallet is sensed in the horizontal upstream chamber and the absence of a pallet is sensed in the horizontal downstream chamber;
  withdrawing a pallet from the horizontal downstream chamber; and
  lowering the stop bar to advance another pallet into the upstream horizontal chamber when that chamber is empty.

7. The method of claim 6, further comprising means for sensing the rotational position of the cage, the means for sensing comprising:
  a pair of openings extending through the shaft at right angles to each other;
  a light source, the light source being disposed relative to the shaft such that a beam of light can be directed through a selected opening in the shaft; and
  a light detector, the light detector being disposed relative to the shaft such that light from the light source can be received by the light detector when the light source and the selected opening are aligned.

8. The method of claim 1, further comprising the steps of:
  painting the repaired pallets;
  drying the painted pallets;
  stenciling identifying indicia onto the dried pallets; and
  stacking the stenciled pallets.

9. A method for repairing block pallets, each pallet being rectangular in plan view and characterized by a plurality of spaced blocks and upper and lower deckboards secured to the blocks, comprising the steps of:
  sorting the pallets into four groups, the first group having no damaged deckboards and no damaged blocks, the second group having one or more damaged deckboards and no damaged blocks, the third group having no damaged deckboards and one or more damaged blocks, and the fourth group having one or more damaged deckboards and one or more damaged blocks;
  as to each pallet in the second group:
    removing any damaged deckboards; and
    replacing the removed deckboards with new deckboards;
  as to each pallet in the third group:
    separating the upper and lower deckboards away from any damaged blocks;
    removing any damaged blocks from between the separated upper and lower deckboards; and
    replacing any removed damaged blocks with new blocks; and
  as to each pallet in the fourth group:
    removing any damaged deckboards;

replacing any damaged deckboards with new deckboards;

separating the upper and lower deckboards away from any damaged blocks;

removing any damaged blocks from between the separated upper and lower deckboards; and replacing any removed damaged blocks with new blocks.

10. The method of claim 9, wherein the step of separating is accomplished by:

providing a table-mounted, powered cam which, when viewed from the end, is elliptical, the minor axis of the ellipse being smaller than the distance between the upper and lower deckboards and the larger axis of the ellipse being larger than the height of the blocks;

disposing the cam such that the major axis of the ellipse is horizontal;

spacing the cam a distance above the upper surface of the table such that upper and lower deckboards can be fitted over the cam;

placing a pallet on the table and moving the pallet such that upper and lower deckboards in the vicinity of a damaged block are disposed about the cam; and pivoting the cam through approximately ninety degrees.

11. The method of claim 10, wherein the cam is secured to the end of a rotatable shaft, an arm is secured to the shaft, and the arm is connected to a power cylinder, the arm being moved upon actuation of the power cylinder such that the shaft is rotated.

12. The method of claim 11, wherein the power cylinder is a pneumatic cylinder.

13. The method of claim 9, wherein the step of inverting the pallets so that the lower deckboards face upwardly is accomplished by:

providing a cage mounted on a rotatable axle, the cage having four chambers into which a pallet can be inserted, each chamber being spaced ninety degrees from adjacent chambers in the direction of rotation of the cage;

providing a first conveyor having powered rollers on which pallets are disposed for movement therealong, the first conveyor being disposed upstream of the cage and adapted to feed pallets into the cage;

providing a second conveyor having powered rollers on which pallets are disposed for movement therealong, the second conveyor being disposed downstream of the cage and adapted to withdraw pallets from the cage;

providing a movable stop bar immediately upstream of the cage, the stop bar being movable from a first position where movement of pallets into the cage is prevented, and a second position where movement of pallets into the cage is permitted;

orienting the cage so that two opposed chambers are horizontal and two opposed chambers are vertical;

sensing the presence or absence of a pallet in the upstream horizontal chamber;

sensing the presence or absence of a pallet in the downstream horizontal chamber;

lowering the stop bar to advance a pallet into the upstream horizontal chamber when that chamber is empty;

raising the stop bar to prevent the immediate upstream pallet from impeding movement of the cage;

rotating the cage ninety degrees in the direction of conveyor movement when the presence of a pallet is sensed in the horizontal upstream chamber and the absence of a pallet is sensed in the horizontal downstream chamber;

withdrawing a pallet from the horizontal downstream chamber; and lowering the stop bar to advance another pallet into the upstream horizontal chamber when that chamber is empty.

14. The method of claim 9, further comprising the steps of:

painting the repaired pallets;

drying the painted pallets;

stenciling identifying indicia onto the dried pallets; and stacking the stenciled pallets.

* * * * *